(12) United States Patent
Li

(10) Patent No.: US 6,639,584 B1
(45) Date of Patent: Oct. 28, 2003

(54) METHODS AND APPARATUS FOR CONTROLLING A PORTABLE ELECTRONIC DEVICE USING A TOUCHPAD

(76) Inventor: Chuang Li, 19884 Charters Ave., Saratoga, CA (US) 95070

( * ) Notice: Subject to any disclaimer, the term of this patent is extended or adjusted under 35 U.S.C. 154(b) by 0 days.

(21) Appl. No.: 09/348,806

(22) Filed: Jul. 6, 1999

(51) Int. Cl.⁷ .................................................. G09G 5/00
(52) U.S. Cl. ..................... 345/173; 345/179; 178/18.01
(58) Field of Search ................... 345/156, 173, 345/179, 180, 358, 382, 187; 382/181, 182, 186, 187, 188, 189; 178/18.01, 18.02, 18.03–18.07, 19.01–19.05

(56) References Cited

U.S. PATENT DOCUMENTS

| | | | | |
|---|---|---|---|---|
| 5,157,737 A | * | 10/1992 | Shlarew .................... | 382/315 |
| 5,252,951 A | * | 10/1993 | Tannenbaum et al. ...... | 345/156 |
| 5,564,005 A | | 10/1996 | Weber et al. ................ | 395/161 |
| 5,602,570 A | * | 2/1997 | Capps et al. ................. | 345/173 |
| 5,764,218 A | | 6/1998 | Della Bona et al. ........ | 345/157 |
| 5,796,406 A | * | 8/1998 | Shigematsu et al. ........ | 345/358 |
| 6,335,726 B1 | * | 1/2002 | Ilan et al. .................... | 345/173 |

FOREIGN PATENT DOCUMENTS

| | | | | |
|---|---|---|---|---|
| DE | 195 10 657 | | 2/1996 | ........... G06F/3/033 |
| DE | 197 29 086 | | 1/1999 | ........... G06K/11/18 |
| EP | 0 330 767 | | 9/1989 | ........... G06K/11/06 |
| GB | 2 327 558 A | * | 1/1997 | ........... G06F/3/033 |
| GB | 2 327 558 | | 1/1999 | ........... G06F/3/033 |

OTHER PUBLICATIONS

"Cellular Phone with Integrated MP3 Player", *Research Disclosure*, GB, Industrial Opportunities Ltd. Havant, No. 418, p. 184 (Feb. 1999).

"Organizer Spielt MP3–Musik", *CT Magazin Fuer Computer Technik*, DE, Verlag Heinz Heise GNBH., Hannover, No. 12, p. 56 (Jun. 7, 1999).

Palm Computing, Inc., "Palm III Data Sheet", downloaded from hhp://www.palm.com, 2 pages.

Ron Avitzur, "Your Own Handprinting Recognition Engine", *Dr. Dobb's Journal*, pp. 32, 34, 36–37 and 103, Apr. 1992.

\* cited by examiner

*Primary Examiner*—Vijay Shankar
*Assistant Examiner*—Mansour M. Said
(74) *Attorney, Agent, or Firm*—Fish & Neave; Norman H. Beamer; Dniel M. Becker

(57) ABSTRACT

Apparatus and methods for controlling a portable electronic device, such as an MP3 player; portable radio, voice recorder, or portable CD player are disclosed. A touchpad is mounted on the housing of the device, and a user enters commands by tracing patterns with his finger on a surface of the touchpad. No immediate visual feedback is provided as a command pattern is traced, and the user does not need to view the device to enter commands. A microcontroller within the device matches the pattern traced by the user against a plurality of preset patterns, each of which corresponds to a predefined function or command of the device. If the pattern traced by the user is a reasonably close match to any of the preset patterns, the device performs the predefined function corresponding to the matched pattern. The touchpad replaces the numerous buttons that are typically used to control portable electronic devices, thereby enhancing usability and reducing manufacturing costs.

27 Claims, 4 Drawing Sheets

METHODS AND APPARATUS FOR CONTROLLING A PORTABLE ELECTRONIC DEVICE USING A TOUCHPAD

FIELD OF THE INVENTION

The present invention relates generally to methods and apparatus for controlling the operation of a portable electronic device, such as a portable radio, cassette player, voice recorder, or MP3 player. More particularly, the present invention relates to using a touchpad to control a portable electronic device.

BACKGROUND OF THE INVENTION

As technology advances, portable electronic devices, such as portable radios, CD-players, voice recorders, and cassette tape players are becoming smaller, and are integrating an increasing number of functions. With the recent introduction of portable MP3 players, and other portable devices that play music from solid state memory or other digital storage, portable electronic devices may become still smaller, and even more complex to operate.

As used herein, a portable electronic device refers to one of a wide variety of small, portable consumer electronic devices that are primarily designed to perform specific predefined functions. Most of these devices are small enough to fit within a pocket, or be clipped onto a belt, though some, such as portable stereos that include speakers may be considerably larger. Many consumer audio devices such as portable radios, cassette players and recorders, portable CD players, voice recorders, and portable MP3 players are among the types of devices that are considered portable electronic devices for purposes of this application. Other portable entertainment devices, such as portable DVD players, as well as other portable electronic devices having specific predefined functions, such as pagers, remote controls, and cellular telephones may also be within the definition of a portable electronic device.

More complex devices, such as portable computers or personal digital assistants (PDAs), which provide general functionality or are extensively programmable are not within the definition of a portable electronic device, as used herein. Although such general purpose devices may include a capability to play audio from storage or from a CD, or may be programmed to perform other functions similar to those performed by portable electronic devices, these are not typically the predefined functions of the device, and are not the functions for which these general purpose devices were primarily designed. General purpose devices, such as portable computers and PDAs do not compete in the same market as portable electronic devices, do not typically include the same limited-purpose components and predefined functions, and do not face the same cost and usability concerns as portable electronic devices.

Typically, portable electronic devices include numerous buttons, switches, knobs, and displays to permit a user to control the operation of the device. All of these components take space on the housing of the device, and thereby limit the ability to reduce the size of the device. Reducing the size of these components may cause usability problems, since pressing tiny buttons and reading miniature displays may be awkward or irritating for many users. These problems are becoming more severe, since an increased number of integrated functions typically requires an increased number of buttons to control all of the functions.

The use of numerous small buttons and switches to control portable electronic devices also results in complex and inconvenient operation. Particularly, it may be difficult to find a desired button among the many buttons on such a device. Finding the correct button may be particularly difficult when attempting to operate the device without looking at it, as would be typical when the device is kept in a pocket, attached to a belt, or used during physical activity, such as jogging. Since these are among the major intended uses of portable electronic devices, this usability problem is a serious concern.

The use of numerous buttons to control these devices also increases the cost and decreases the manufacturing yield of the devices. Typically, assembly of the numerous buttons on a portable electronic device must be completed by hand, resulting in higher manufacturing costs and lower yields. Additionally, each button, switch, or knob is a separate mechanical component which may fail, reducing the manufacturing yield and the reliability of the devices.

Various input and control methods have been successfully used on other types of portable electronic equipment. On portable computers, input devices such as trackballs, touchpads, and control sticks have been used to control the movement of a cursor on a screen. Cursor movement may be used to control the operation of a variety of applications running on a portable computer. In personal digital assistants (PDAs), such as the PALMPILOT™, a tradmark of Palm Computing, Inc. (a subsidiary of 3Com Corporation), of Santa Clara, Calif., which have some of the same size concerns as portable electronic devices, pen-based input and control is common. Typically, a stylus or pen is used to draw characters on a touch-sensitive screen to input the characters into the PDA without using a keyboard. Gestures, such a crossing out a word on the screen, or tapping the stylus over a graphical icon on the screen may be used to enter and edit text, or to control the operation of a typical PDA.

On portable computers, immediate visual feedback from the pointing device, typically provided in the form of cursor motion on a screen, is critical to operation of the computer. Without this feedback, the user would have no ability to determine where the cursor is located, and no ability to position the cursor over icons or other controls on the screen, which are used to control the operation of the portable computer.

PDAs, such as the PALMPILOT™, while less reliant on immediate visual feedback than personal computers, still rely on the user being able to view a screen built into the PDA to control the operation of the PDA. Most operations on the PALMPILOT™, for example, are specified by tapping a stylus over an icon or control that appears on the screen. Other gestures are used to enter and edit text—another activity that demands that a user view the screen to see the text that is being entered.

While this type of visual interface may be desirable for personal computers and PDAs, most portable electronic devices lack the type of display device that would permit such highly visual methods to be used. Additionally, users of most portable electronic devices are interested in operating the device with a minimal amount of difficulty. Ideally, a user should be able to operate the device quickly, easily, and without having to view a display while operating the device. Since methods of using touch-sensitive devices on personal computers and PDAs provide immediate visual feedback as an important part of their user interface, or require interaction with visual elements on a screen, they typically demand that a user view a display on the device while the device is being operated. This renders these methods unsuitable for use on a wide variety of portable electronic devices.

Additionally, use of a stylus or pen to enter commands is unacceptable for most portable electronic devices, since attempting to use a pen while jogging or engaging in other physical activity would be nearly impossible for most users.

In view of the above, it would be desirable to provide a portable electronic device that is easy and convenient to use, even without looking at the device.

It also would be desirable to provide a portable electronic device with a reduced number of buttons disposed on its housing, thereby permitting the space on the device to be used for other purposes, such as providing a larger display, or reducing the size of the device.

It would further be desirable to provide a portable electronic device with reduced manufacturing costs, and higher yields.

SUMMARY OF THE INVENTION

It is an object of the present invention to provide a portable electronic device that is easy and convenient to use, even without looking at the device.

It is also an object of the present invention to provide a portable electronic device with a reduced number of buttons disposed on its housing, thereby permitting the space on the device to be used for other purposes, such as providing a larger display, or reducing the size of the device.

It is a further object of the present invention to provide a portable electronic device with reduced manufacturing costs, and higher yields.

These and other objects of the present invention are achieved by providing apparatus and methods for using a touchpad to control a portable electronic device, such as a portable radio, CD player, cassette tape player, voice recorder, pager, portable DVD player, or MP3 player. Instead of using a plurality of buttons disposed on the housing of the device for control, the present invention teaches use of a single touchpad, on which the user traces patterns to control the device. The device does not need to provide immediate visual feedback, and the patterns are simple enough that they may be entered without requiring that the user view the portable electronic device while entering the commands.

The portable electronic device of the present invention comprises a touchpad disposed on the housing of the device. A microcontroller within the device receives electrical signals from the touchpad, representing x-y coordinates of the location at which a user's finger contacts the touchpad. Alternatively, the touchpad may send signals indicative of the motion of a user's finger across the surface of the touchpad. The microcontroller compares the data received from the touchpad with a plurality of patterns stored in a memory coupled to the microcontroller.

Each of the stored patterns represents a command or function of the portable electronic device. If the microcontroller determines that the data received from the touchpad matches one of the patterns, the microcontroller causes the device to perform the command or function associated with the matched pattern.

In a preferred embodiment of the portable electronic device of the present invention, a pattern representing a function does not need to be matched precisely. A "close" match, in which the pattern is scaled, translated, or rotated within preset bounds will be sufficient to indicate a match. Additionally, some variation in timing or speed at which a pattern is traced may be tolerated in the matching process.

The present invention also discloses a method for controlling a portable electronic device by receiving data from a touchpad, and comparing the data with a plurality of predefined patterns, each of which represents a function of the portable electronic device. If a matching pattern is found, the function represented by the matching pattern is performed.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
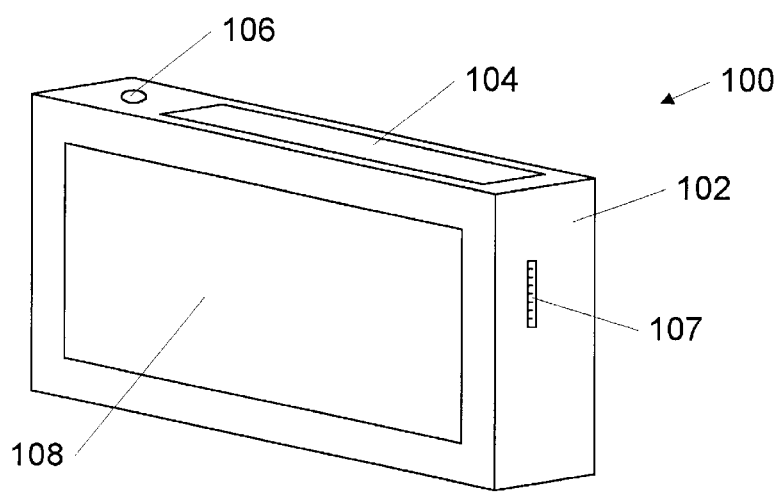
FIG. 1 shows a portable electronic device built in accordance with the principles of the present invention.

Referring to FIG. 1, a view of a portable electronic device constructed in accordance with the principles of the present invention is shown. The embodiment shown in FIG. 1 is a portable MP3 music player, that plays music formatted according to the MPEG audio layer 3 standard. It will be evident to one skilled in the art that the features of the present invention could be readily adapted for use in a portable CD player, cassette player/recorder, voice recorder, pager, portable DVD player, remote control, or other portable electronic device. Additionally, it will be understood that use of the MPEG audio layer 3 (MP3) standard in the music player of FIG. 1 is for illustration, and that the features of the present invention could be used on a digital music player that plays music encoded in any other digital music format.

Music player 100 comprises housing 102, liquid crystal display 104, headphone jack 106, data port 107, and touchpad 108. Additionally, the housing may have a feature that permits the user to determine the orientation of the device, preferably without looking at the device. For music player 100, the placement of liquid crystal display 104, headphone jack 106, or data port 107 may permit the user to determine the orientation. Other features, such as a distinctive housing shape (not shown), or a belt clip (not shown) may also permit the user to determine the orientation of the device. Alternatively, electronic means may be used to specify the orientation of the device. For example, the user may tap on the top edge of touchpad 108 when the device is started to specify the orientation of the device.

The user controls operation of music player 100 by tracing simple patterns with his finger on the surface of touchpad 108. For example, by moving his finger across touchpad 108 from left to right, the user instructs music player 100 to advance to the next song. By tapping twice on the surface of touchpad 108, the user instructs music player 100 to pause. It should be noted that unlike touchpads used for moving a cursor on a computer screen, no immediate visual feedback needs to be given to the user while he or she enters a command. Only once a command is completed is there a feedback in the form of executing the command, such as playing the music or stopping the music, indicating that the command was recognized.

Advantageously, since music player 100 is not controlled using a plurality of buttons, it should be relatively easy for a user to control music player 100, even without looking at music player 100 or receiving any other visual feedback. To enter commands, the user need only locate and use touchpad 108—the only control on the face of housing 102. Additionally, since music player 100 does not need a plurality of buttons and other controls, housing 102 can be made as small as the size of touchpad 108 and the functions of music player 100 permit (e.g. a cassette player could not be made smaller than the size of a cassette tape). Since touchpads are a mass-produced, inexpensive component, use of touchpad 108 also may reduce the overall cost of manufacturing music player 100, as compared to a music player that uses buttons to control operation. A preferred embodiment of the present invention uses a resistive touchpad, since resistive touchpads are currently less expensive than capacitive touchpads.

It will be understood by one skilled in the art that various changes may be made to the arrangement and composition of controls on housing 102 without departing from the invention. For example, housing 102 may include an optional belt clip (not shown), contacts (not shown) for a battery charger or data download device, and an opening (not shown) in which a battery or additional memory may be added. Additionally, depending on the functions performed by music player 100, it may be desirable to add function switches or buttons (not show), for selecting a function, for turning music player 100 off, for disabling touchpad 108, or for performing other functions that are not selected using touchpad 108.

Figure 2A:
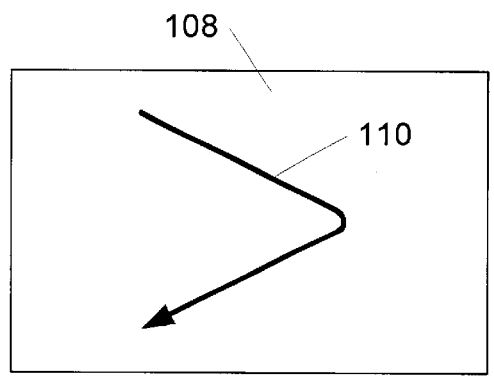
FIGS. 2A–2K show illustrative commands that may be entered through a touchpad to control a portable electronic device.

Referring now to FIGS. 2A–K, illustrative patterns that may be traced on the surface of touchpad 108 to control the operation of music player 100 are shown. FIG. 2A shows a pattern representing the "play" command. By sweeping his or her finger rapidly across the surface of touchpad 108 in a motion such as shown by arrow 110, with a left-to-right downward diagonal motion followed by a right-to-left downward diagonal motion, the user instructs music player 100 to start playing a song, or to resume playing after the player has been paused.

Figure 2B:
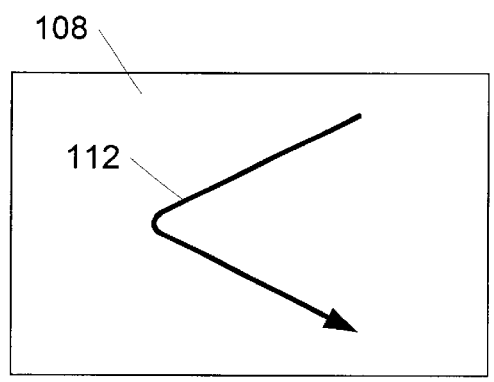

FIG. 2B shows a "stop" command. A right-to-left downward diagonal sweep followed by a left-to-right downward diagonal sweep, as traced by arrow 112, may be used to command music player 100 to stop playing a song.

Figure 2C:
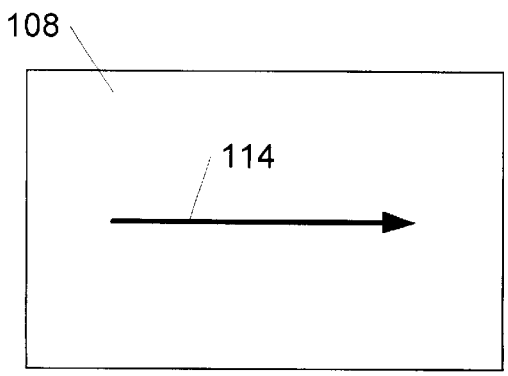
Figure 2D:
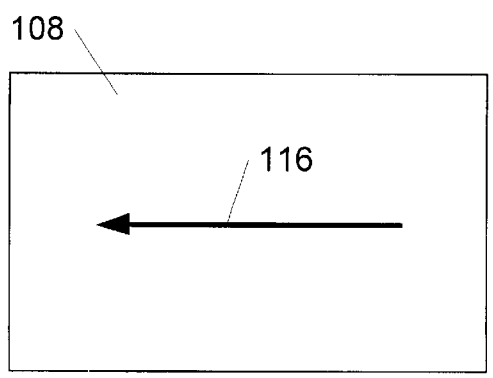

FIGS. 2C and 2D show, respectively, commands for advancing to the next song, or skipping to the previous song. By moving a finger across touchpad 108 in a left-to-right direction, as shown by arrow 114 of FIG. 2C, the user commands music player 100 to advance to the next song. By moving a finger across touchpad 108 in a right-to-left motion, as shown by arrow 116 of FIG. 2D, the user commands music player 100 to back up to the previous song.

Figure 2E:
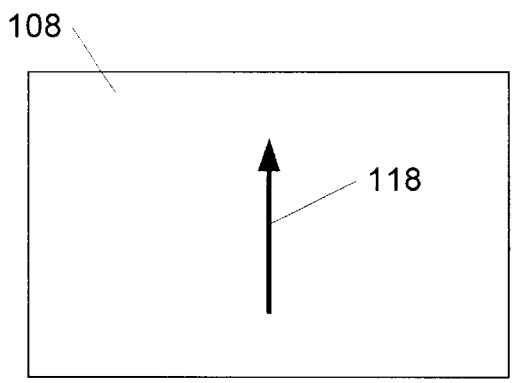
Figure 2F:
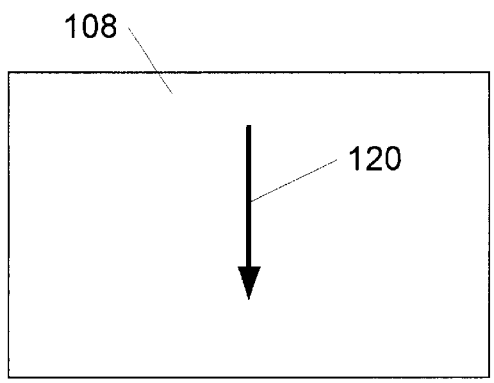
Figure 2G:
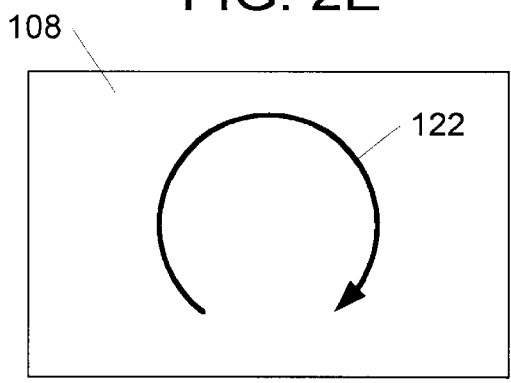
Figure 2H:
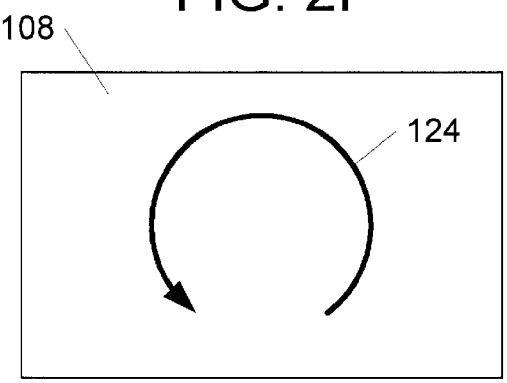

An upward motion, as shown by arrow 118 of FIG. 2E increases the volume. A downward motion, as shown by arrow 120 of FIG. 2F may be used to decrease the volume.

Circular motions may also be used to indicate commands. A clockwise circular motion, such as is shown by arrow 122 of FIG. 2G commands the player to repeat the current song or "repeat range", while a counterclockwise circular motion, as indicated by arrow 124 of FIG. 2H may be used to set the repeat range.

Figure 2I:
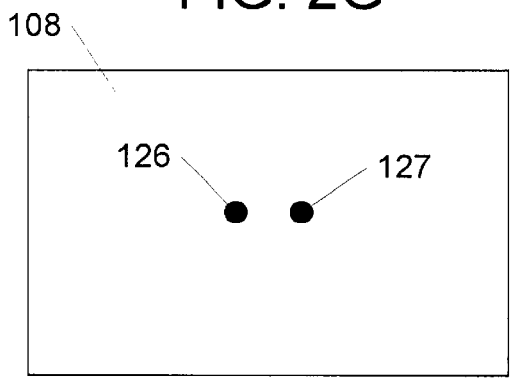
Figure 2J:
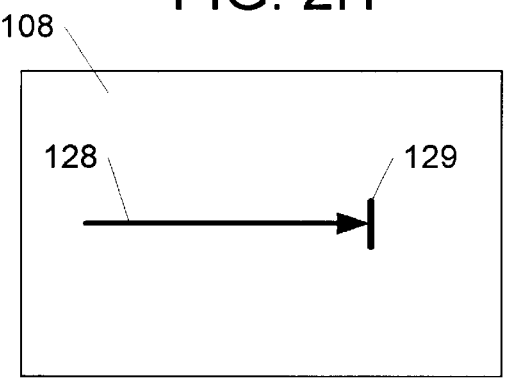
Figure 2K:
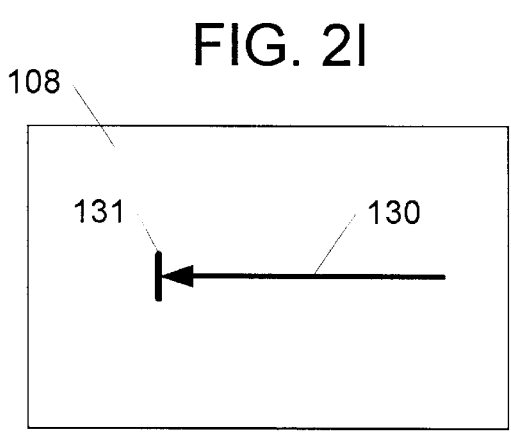

Tapping a finger against the surface of touchpad 108 may also be used to form commands. A tap is indicated as a dot in the figures, and although the dots are shown at specific locations on touchpad 108, tapping at most locations on touchpad 108 is equally effective. FIG. 2I shows a pause command, consisting of two taps on touchpad 108, indicated by dots 126 and 127.

Holding a finger on the surface of touchpad 108 may be used to specify commands or functions. This action is shown in the figures as a short vertical line. A left-to-right motion followed by holding the finger on touchpad 108, as shown by arrow 128 and line 129 of FIG. 2J, may be used to put the player in a "fast-forward" mode. The player keeps running in fast forward mode while the user holds his finger on touchpad 108. A right-to-left motion followed by holding the finger on touchpad 108, as shown by arrow 130 and line 131 of FIG. 2K, may be used to put the player into a "fast-reverse" mode. The player will remain in fast reverse mode until the user's finger is lifted from touchpad 108.

Advantageously, all of these commands are relatively simple and intuitive. It should be easy for most users to learn these commands, and easy to use the commands without having to look at touchpad 108 while entering the commands.

It should also be noted that there may be a timing or speed factor in commands entered into touchpad 108. In a preferred embodiment, for example, commands (with the exception of the fast forward and fast reverse commands) must occur within a predetermined period of time. Thus, once a command is started, it must be completed within the predetermined period. The predetermined time period is typically between 50 and 1500 milliseconds, though other values are possible. This permits compound commands to be distinguished from commands consisting of the individual elements of the compound command.

Although the commands described above are specific to a random-access music player, such as an MP3 player (or other memory-based music player) or CD player, it will be understood that similar commands may be used to control the operation of other portable electronic devices. For example, a "play" command on a cassette player could be the same as the "play" command shown above in FIG. 2A. On a portable radio, the circular motions shown in FIGS. 2G and 2H may be used to scan forward and backward, searching for stations, while the left-to-right and right-to-left motions shown in FIGS. 2C and 2D may be used to go to the next or previous station in a list of pre-set stations.

It will be understood by one skilled in the art that the commands shown with reference to FIGS. 2A–2K are for illustration. Other combinations of motions, tapping, and holding a finger on the surface of touchpad 108 could be used to perform the commands and functions discussed with reference to FIGS. 2A–2K without departing from the present invention.

Additional commands combining the motions shown above, or using other motions may be used to represent additional functions. For example, a downward motion followed by a tap may be used as a "mute" command. A repeated rapid back and forth motion in a generally left-to-right and right-to-left direction, or a motion in the form of an "X" or cross may be used by an MP3 player to remove the current song from memory. On a device combining the functions of an MP3 player with the functions of a portable radio, a clockwise circular motion followed by a tap may be used to switch between an MP3 mode and a radio mode. Nearly any number of functions may be represented by relatively simple patterns or combinations of simple patterns that may be traced using a finger or other pointing device on a touchpad.

Additionally, some commands entered into the portable electronic device of the present invention could be dependent on the position on the touchpad at which the command is entered. For example, on a multi-function device, such as a music player combining the functions of an MP3 player, a voice recorder, and a radio, sweeping a finger or other pointing device across a top edge of touchpad 108 may cause the player to switch to the next function, while sweeping across a bottom edge of touchpad 108 causes the player to switch to the previous function. Tapping on the touchpad at the corners of the touchpad could also be used to enter commands or specify functions. Preferably, these position-dependent commands should only use positions on the touchpad such as the edges or corners, that may be located without requiring the user to view the device during operation.

As shown in FIGS. 3A–3D, the entry of commands into touchpad 108 does not need to be precise. Any of the left-to-right motions shown in FIGS. 3A–3C will be recognized as the same command, while the motion shown in FIG. 3D will be recognized as a downward motion, rather than a left-to-right motion. In FIGS. 3A–3D, touchpad 108 is shown divided into eight segments to illustrate the range of motions that may be recognized as the same command.

Figure 3A:
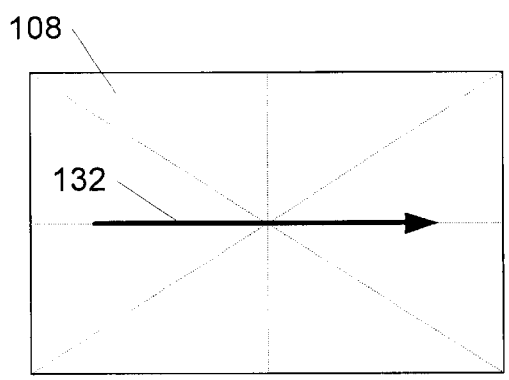
FIGS. 3A–3D show a range of variation in entering a command on a touchpad.
Figure 3B:
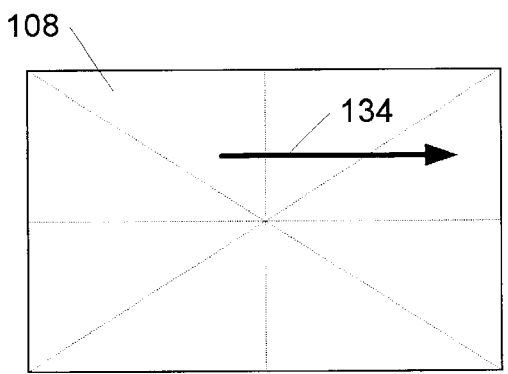
Figure 3C:
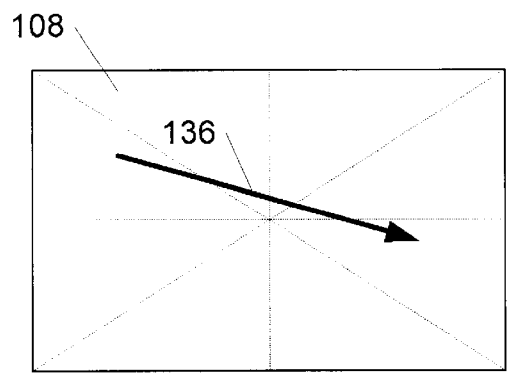
Figure 3D:
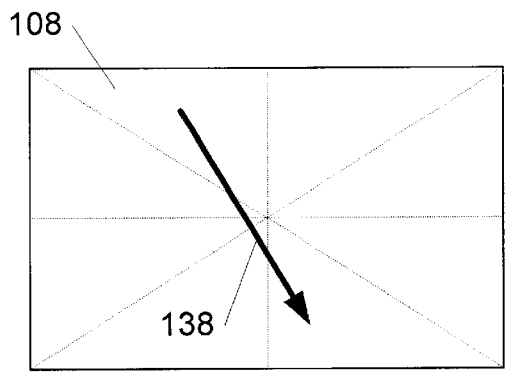

FIG. 3A shows a perfectly formed left-to right motion (arrow 132) through the center of touchpad 108. As shown in FIG. 3B, a similar motion (arrow 134), translated to a different position on the touchpad, and adjusted slightly in scale will still be recognized. FIG. 3C shows that another similar motion (arrow 136), that is translated from the center of the pad, and rotated slightly will also be recognized. When the motion is rotated so that it is more downward than left-to-right, as shown by arrow 138 in FIG. 3D, the system will recognize the motion as a downward motion.

All of the commands recognized by music player 100 may be translated, rotated, scaled, and adjusted in timing and speed of tracing the pattern, within preset bounds, and still be recognized. This makes use of music player 100 more convenient, and permits users to quickly enter commands without looking at touchpad 108, or being too concerned with precision in moving a finger across touchpad 108.

Figure 4:
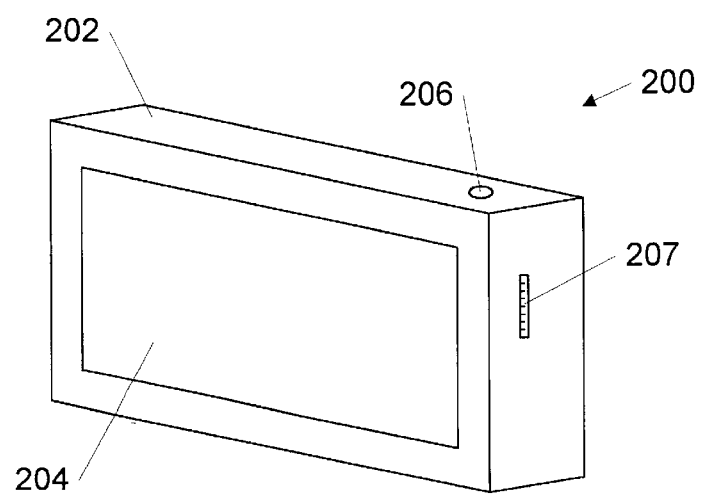
FIG. 4 shows an alternative embodiment of a portable electronic device built in accordance with the principles of the present invention.

Referring now to FIG. 4, an alternative embodiment of a portable electronic device built in accordance with the principles of the present invention is shown. As above, a portable MP3 device is shown in the figure, though it will be understood that the features of this embodiment could be adapted, mutatis mutandis, to other portable electronic devices, such as radios, voice recorders, cassette players, portable DVD players, pagers, remote controls, or CD players.

Music player 200 comprises housing 202, touchscreen 204, headphone jack 206, and data port 207. Touchscreen 204 combines the functions of a display and a touchpad, permitting the user to enter commands in the manner described hereinabove, while providing a relatively large display. Advantageously, music player 200 has a large display, without increasing the size of housing 202 to accommodate both a display and controls.

Unlike the touchscreen used on a typical PDA, touchscreen 204 does not need to provide any immediate visual feedback (e.g. movement of a cursor or displaying the path traced by the user) while the user is entering a command, and the user's interaction with touchscreen 204 does not depend on the position of icons or controls displayed on touchscreen 204. Specifically, the same commands that were used on music player 100 of FIG. 1 may be used on music player 200. The user does not need to view touchscreen 204 to operate music player 200. Thus, the touch-sensitive functionality of touchscreen 204 is effectively decoupled from the display aspects of touchscreen 204.

As discussed above, housing 202 may include an optional belt clip (not shown), contacts (not shown) for a battery charger or data download device, an opening (not shown) in which a battery or additional memory may be inserted, an on-off or function switch (not shown), additional buttons (not shown), or other additional features without departing from the present invention.

Figure 5:
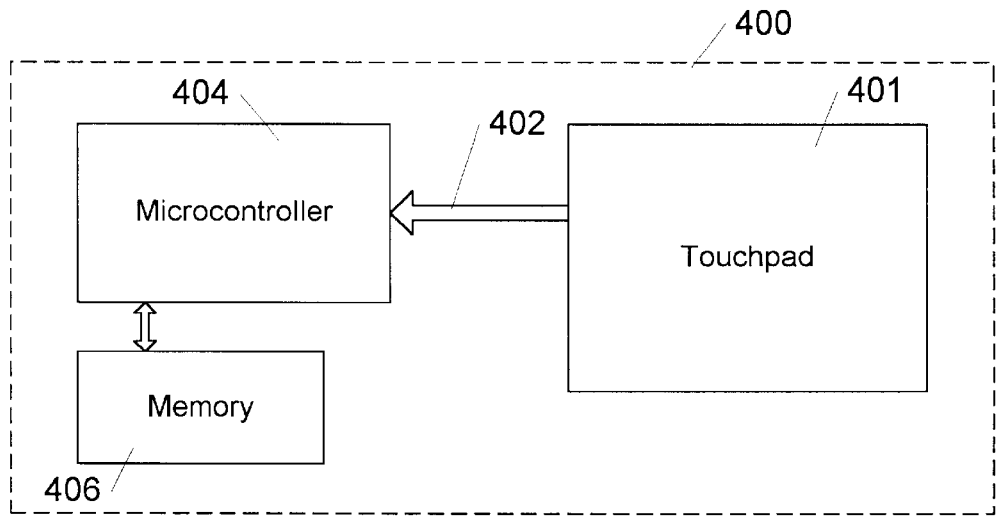
FIG. 5 is a block diagram of the electronics of a portable electronic device built in accordance with the principles of the present invention.

FIG. 5 shows a block diagram of the electronics of a portable electronic device built in accordance with the principles of the present invention. Portable electronic device 400 comprises touchpad 401, which continuously translates a point touched by a user's finger into an x-y coordinate, which is electrically transmitted across bus 402 to microcontroller 404. Alternatively, touchpad 401 may send data about the motion of the user's finger across the touchpad to microcontroller 404. Microcontroller 404 is coupled to memory 406, which may be internal to microcontroller 404, and is programmed to receive data from touchpad 401 and compare the received data with a plurality of patterns stored in memory 406.

In a preferred embodiment, touchpad 401 interrupts microcontroller 404 when the user's finger comes into contact with touchpad 401, after which microcontroller 404 polls touchpad 401 to receive x-y coordinate or motion information. Microcontroller 404 collects these data over a predetermined period of time, typically ranging between 50 and 1500 milliseconds. Microcontroller 404 compares the data with a plurality of preset patterns stored in memory 406, to determine if one of the preset patterns matches the data.

The match does not need to be precise, and, as described hereinabove, translation, rotation, scaling, and timing differences between the preset patterns and the data will be tolerated within preset bounds. In a preferred embodiment, this is achieved by basing the matching on a scaled difference between adjacent data points in the coordinate data, rather than on the coordinate data itself. This scaled difference represents the direction and speed of motion of the user's finger across touchpad 401, rather than exact x-y coordinates, making it easier to match patterns in spite of scaling, rotation, translation, and timing differences. For touchpads that send motion information, rather than x-y coordinates, the motion data may be used directly in the pattern matching.

The pattern matching is performed using any one of a large number of pattern matching algorithms. Depending on the algorithm used, portable electronic device 400 may not need to store the coordinate or motion information sent to microcontroller 404 by touchpad 401. Matching may be performed as the data is sent, using, for example, a finite state machine-based matching algorithm. In this case, it is not necessary to store the coordinate or motion information. In a preferred embodiment, matching is performed using a previously known octant and quadrant-based matching algorithm, such as is described in the article "Your Own Handwriting Recognition Engine," by Ron Avitzur, in Dr. Dobb's Journal, April, 1992, at pages 32–37, and 103. This type of algorithm matches patterns based on octant and quadrant information, so only octant and quadrant information on the coordinate data needs to be kept.

Each of the preset patterns corresponds to a function or command of portable electronic device 400. If a sufficiently close match between a preset pattern and the coordinate data collected over the predetermined time period is detected, microcontroller 404 will generate signals to cause portable electronic device 400 to carry out the function or command corresponding to the matched pattern. If microcontroller 404 is the main processor for portable electronic device 400, then microcontroller 404 may execute the command or function directly. Alternatively, if portable electronic device 400 includes another processor or microcontroller that performs control functions, microcontroller 404 may send the other processor a signal indicating which function or command should be performed. It is also possible for microcontroller 404 to directly handle a subset of the functions or commands, while sending signals for other functions or commands to another processor.

For example, if portable electronic device 400 is an MP3 player, microcontroller 404 may be responsible for decoding and playing MP3 music stored in memory 406 or other memory (not shown) connected to microcontroller 404, as well as matching and handling commands from touchpad 401. Advantageously, by using a single microcontroller to decode and handle commands and to play music, the component count and manufacturing costs of portable electronic device 400 are kept relatively low. Alternatively, if portable electronic device 400 is a cassette player, it may be necessary for microcontroller 404 to send commands on to other electronic or electromechanical components within portable electronic device 400.

It will be understood that there are many variations on the apparatus and methods described with reference to FIG. 5. For instance, instead of being interrupt-driven, microcontroller 404 may continually poll touchpad 400 to determine when the user starts entering a command, or may wait for coordinate data to arrive across bus 402. Additionally, microcontroller 404 may wait until coordinate data have been collected for the entire predetermined time period before starting the matching process, or the matching may begin as soon as there is sufficient coordinate data to begin the matching process.

Figure 6:
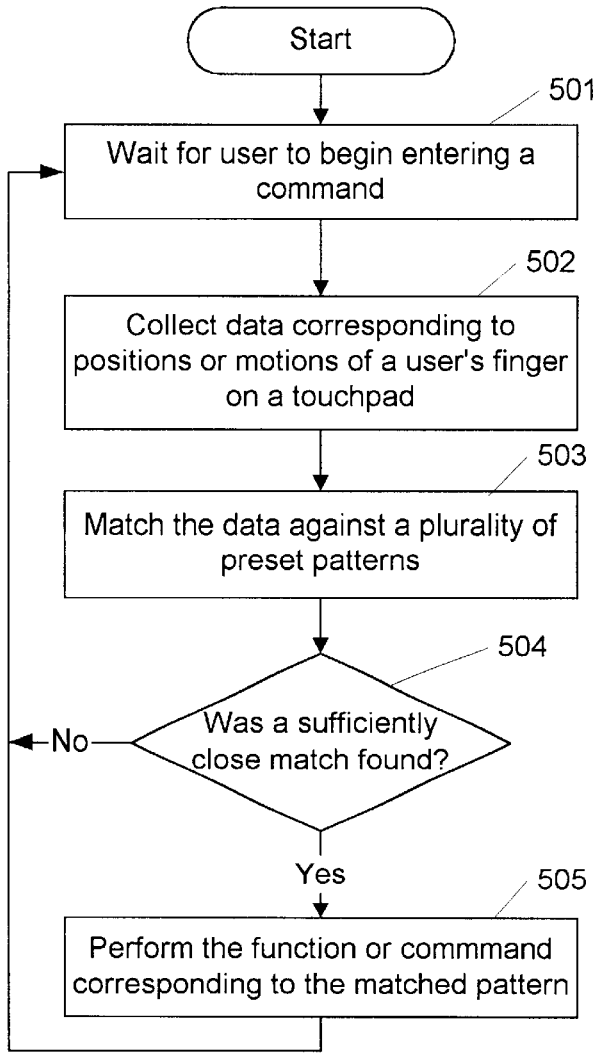
FIG. 6 is a flowchart of a method in accordance with the present invention for receiving, matching, and performing a command.

FIG. 6 shows a flowchart of the method performed by microcontroller 404. At step 501, the system waits for the user to begin entering a command on a touchpad. Once the user's finger contacts the touchpad, a plurality of data points corresponding to the position of a user's finger on a touchpad are collected at step 502. Alternatively, the data points may correspond to the motion of the user's finger across the touchpad. In a preferred embodiment, these data are collected over a predetermined period of time. At step 503, the collected data are matched against a plurality of preset patterns, each of the patterns corresponding to a command or function of a portable electronic device. If any of the patterns are deemed to be matched (step 504), the command or function is performed by the portable electronic device (step 505). Otherwise, the system returns to step 501, and waits for the next command.

It will be understood that microcontroller 404 does not need to be idle between the steps shown in FIG. 6. Microcontroller 404 could, for example, play music, decode MP3 format compressed music, or perform other normal functions of a portable electronic device between performing the steps described in FIG. 7.

Although preferred illustrative embodiments of the present invention are described above, it will be evident to one skilled in the art that various changes and modifications may be made without departing from the invention. For example, although the apparatus and methods of the present invention are described as using a touchpad or touchscreen, almost any touch-sensitive device capable of providing information on locations or motions of a user's finger on a surface of the touch-sensitive device may be used in accordance with the apparatus and methods of the present invention. Additionally, although the described embodiments apply the apparatus and methods of the present invention to a portable MP3 player, it will be understood that the use of patterns or gestures traced on a touchpad to control the functions of a portable electronic device may be used with minimal adaptation on a wide variety of portable electronic devices. Further, although the application refers to MP3 players, there are many similar music compression formats currently known or being developed that could be played on a portable audio music player in addition to, or instead of music in the MP3 format. It is intended in the appended claims to cover all such changes and modifications that fall within the true spirit and scope of the invention.

What is claimed is:

1. A portable electronic device comprising:
   a housing; and
   a touch-sensitive surface mounted on the housing, the portable electronic device controlled by a user tracing a command pattern on the touch-sensitive surface with a finger, the command pattern matching one of a plurality of preset patterns, each of the plurality of the present patterns corresponding to a predefined function of the portable electronic device, the command pattern being traced without requiring the user to view the portable electronic device,
   wherein at least one of the plurality of patterns corresponds to a predefined function that is performed only for so long as contact is maintained with the touch-sensitive surface,
   wherein the command pattern is composed of one of more motions of the finger on the touch-sensitive surface, the one or more motions selected from a group of motions consisting of a left-to-right motion, a right-to-left motion, an upward motion, a downward motion, a clockwise circular motion, a counterclockwise circular motion, a diagonal motion, a tapping motion, and holding the pointing device against the touch-sensitive surface.

2. The portable electronic device of claim 1, wherein the command pattern matches one of the plurality of preset patterns imprecisely, within preset bounds.

3. The portable electronic device of claim 2, wherein the preset bounds permit a range of variation in the translation, rotation, scale, timing, and speed of tracing the command pattern.

4. The portable electronic device of claim 1, wherein the touch-sensitive surface comprises a touchpad.

5. The portable electronic device of claim 1, wherein the portable electronic device further comprises a display.

6. The portable electronic device of claim 1, wherein the portable electronic device is a portable entertainment device.

7. The portable electronic device of claim 6, wherein the portable electronic device is a music player.

8. The portable electronic device of claim 1, wherein the portable electronic device includes predefined functions of one or more devices selected from a group consisting of an MP3 player, a cassette player, a cassette recorder, a CD player, a radio, a voice recorder, a DVD player, a pager, a remote control, and a digital music player.

9. The portable electronic device of claim 1, wherein the command pattern depends on a position at which the command pattern is traced or tapped on the touch-sensitive surface.

10. A portable electronic device comprising:

a microcontroller;

a memory coupled to the microcontroller, the memory storing a plurality of preset patterns, each one of the plurality of preset patterns corresponding to a predefined function of the portable electronic device;

a touch-sensitive device coupled to the microcontroller, wherein the touch-sensitive device provides data indicative of the position or motion of a user's finger on a surface of the touch-sensitive device to the microcontroller; and a housing containing the microcontroller, memory and touch-sensitive device, wherein the housing is configured to be used in any one of a plurality of orientations, wherein the microcontroller is programmed to:
recognize a selected orientation for the device;
collect the data without requiring a user to view the portable electronic device;
match the data against the plurality of preset patterns while taking into account any one of the plurality of orientations of the housing to determine a matched pattern if any one of the plurality of preset patterns sufficiently matches the data;
cause the portable electronic device to perform the predefined function that corresponds to the matched pattern; and
permit variation, within preset bounds, in translation, rotation, scale, timing, and speed of tracing of a pattern when the data is matched against the plurality of preset patterns.

11. The portable electronic device of claim 10, wherein the microcontroller is programmed to collect the data over a predetermined period of time.

12. The portable electronic device of claim 10, wherein the microcontroller is programmed to perform one or more of the predefined functions of the portable electronic device.

13. The portable electronic device of claim 10, wherein the touch-sensitive device comprises a touchpad.

14. The portable electronic device of claim 10, wherein the portable electronic device comprises a display.

15. The portable electronic device of claim 10, wherein the portable electronic device is a portable entertainment device.

16. The portable electronic device of claim 15, wherein the portable electronic device is a music player.

17. The portable electronic device of claim 10, wherein the portable electronic device includes predefined functions of one or more devices selected from a group consisting of an MP3 player, a cassette player, a CD player, a radio, a voice recorder, a DVD player, a pager, a remote control, and a digital music player.

18. A method of controlling a portable electronic device using a touch-sensitive device, the method comprising:
establishing a starting orientation for a housing of the device;
contacting a surface of the touch-sensitive device;
collecting data corresponding to a pattern traced across the surface of the touch-sensitive device without requiring a user to view the portable electronic device;
matching the data, based on the starting orientation, against a plurality of preset patterns, each one of the preset patterns corresponding to a predefined function of the portable electronic device;
determining whether a sufficiently close match was found; and
performing the predefined function corresponding to a matched one of the plurality of preset patterns if a sufficiently close match was found only for so long as contact is maintained with the touch-sensitive surface,
wherein matching the data against the plurality of preset patterns permits variation, within preset bounds, in translation, rotation, scale, timing and speed of tracing of a pattern.

19. The method of claim 18, wherein collecting the data is performed over a predetermined period of time.

20. A portable electronic device comprising:

a housing; and a touch-sensitive surface mounted on the housing, the portable electronic device controlled by a user tracing a command pattern on the touch-sensitive surface with a finger, the command pattern matching one of a plurality of preset patterns, each of the plurality of the present patterns corresponding to a predefined function of the portable electronic device, the command pattern being traced without requiring the user to view the portable electronic device,
wherein at least one of the plurality of patterns corresponds to a predefined function that is performed only for so long as contact is maintained with the touch-sensitive surface,
wherein the command pattern depends on a position at which the command pattern is traced or tapped on the touch-sensitive surface.

21. The portable electronic device of claim 20, wherein the command pattern matches one of the plurality of preset patterns imprecisely, within preset bounds.

22. The portable electronic device of claim 21, wherein the preset bounds permit a range of variation in the translation, rotation, scale, timing, and speed of tracing the command pattern.

23. The portable electronic device of claim 20, wherein the touch-sensitive surface comprises a touchpad.

24. The portable electronic device of claim 20, wherein the portable electronic device further comprises a display.

25. The portable electronic device of claim 20, wherein the portable electronic device is a portable entertainment device.

26. The portable electronic device of claim 25, wherein the portable entertainment device is a music player.

27. The portable electronic device of claim 20, wherein the portable electronic device includes predefined functions of one or more devices selected from a group consisting of an MP3 player, a cassette player, a CD player, a radio, a voice recorder, a DVD player, a pager, a remote control, and a digital music player.

* * * * *